United States Patent [19]
Strok et al.

[11] Patent Number: 5,952,768
[45] Date of Patent: Sep. 14, 1999

[54] TRANSPARENT HEAT CONSERVING COATING FOR METAL HALIDE ARC TUBES

[75] Inventors: Jack M. Strok, Garrettsville; Gary R. Allen, Chesterland; Thomas G. Parham, Gates Mills, all of Ohio

[73] Assignee: General Electric Company, Schenectady, N.Y.

[21] Appl. No.: 08/332,317

[22] Filed: Oct. 31, 1994

[51] Int. Cl.⁶ ........................................ H01J 61/34
[52] U.S. Cl. ........................................ 313/110
[58] Field of Search ........................... 313/110, 111, 313/112, 580, 635, 492, 488, 113, 489

[56] References Cited

U.S. PATENT DOCUMENTS

| | | |
|---|---|---|
| 4,047,966 | 9/1977 | Bihuniak et al. . |
| 4,307,315 | 12/1981 | Meulemans ........................ 313/44 |
| 4,368,945 | 1/1983 | Fujimori et al. . |
| 4,467,238 | 8/1984 | Silverstein et al. . |
| 4,639,069 | 1/1987 | Yatabe et al. . |
| 4,645,290 | 2/1987 | Walsh . |
| 4,949,005 | 8/1990 | Parham ........................... 313/112 |
| 4,987,343 | 1/1991 | Kosmatka et al. . |
| 5,017,839 | 5/1991 | Arlt ............................... 313/572 |
| 5,059,865 | 10/1991 | Bergman ......................... 313/112 |
| 5,196,759 | 3/1993 | Parham et al. . |
| 5,199,785 | 4/1993 | Scholz . |
| 5,221,876 | 6/1993 | Bergman et al. . |
| 5,239,406 | 8/1993 | Lynam . |

*Primary Examiner*—Sandra O'Shea
*Attorney, Agent, or Firm*—Pearne, Gordon, McCoy & Granger LLP

[57] ABSTRACT

A metal halide arc tube is provided having a light-transmitting envelope and electrodes for generating an arc discharge within a sealed chamber of the envelope. The envelope includes a transparent film at a cold region of the sealed chamber where metal halides migrate and condense. The transparent film transmits visible radiation and absorbs ultraviolet radiation emitted by the arc to impose an additional heat load on the cold region so that a high metal halide vapor pressure can be maintained. The temperature of a hot region of the envelope can be maintained at a lower level by reducing power input or increasing chamber surface area. Preferably, the transparent film reflects infrared radiation emitted by the light source back to the arc to increase efficiency and further increase the temperature of the cold region due to decreased thermal emittance. The transparent film is preferably a dichroic coating having alternating layers of high and low index of refraction refractory materials.

23 Claims, 1 Drawing Sheet

5,952,768

TRANSPARENT HEAT CONSERVING COATING FOR METAL HALIDE ARC TUBES

BACKGROUND OF THE INVENTION

1. Field of the Invention

The present invention generally relates to electric lamps, and more particularly, to electric lamps having a light source with a transparent heat conserving coating.

2. Description of the Related Art

Metal halide arc discharge lamps are frequently employed because of their high luminous efficacy and long life. A typical metal halide arc discharge lamp includes a quartz lamp capsule or arc tube having a bulbous portion containing fill material. The fill material is typically mercury, a metal halide to improve efficacy and color, and a rare gas to facilitate starting. Tungsten electrodes are sealed in opposite ends of the arc tube to enable energization of a discharge arc within the arc tube.

The initial application of an excitation source across the electrodes causes the rare gas to ionize and produce light. Continued application of the excitation source causes the vaporization and the ionization of the mercury and metal halide to produce light. Due to internal convection a non-uniform temperature distribution occurs in the arc tube bulbous portion. When the arc tube is horizontally disposed the top of the bulbous portion or top wall becomes overheated causing a hot spot or hot region having a temperature hotter than the average temperature of the bulbous portion. Overheating of the arc tube can cause both devitrification of the quartz and reaction of the quartz with the metal halide. In either case the quartz arc tube splits causing premature failure of the lamp.

When the arc tube is horizontally disposed, the bottom of the bulbous portion or bottom wall also becomes relatively cool causing a cold spot or cold region having a temperature colder than an average temperature of the bulbous portion. It is known that metal halides migrate to the coolest spot of the arc tube. Therefore, the metal halides typically migrate to the cold region at the bottom of the bulbous portion and condense on the bottom wall of the arc tube. The metal halides can also migrate to and condense at cold regions at ends of the bulbous portion, a location furthest from the arc discharge. Condensation of the metal halide results in a lower luminous efficacy and color.

It is known to use an infrared reflecting film covering the entire outer surface of the bulbous portion to improve the efficacy of the lamp. For example, see U.S. Pat. Nos. 5,221,876, 5,017,839, and 4,987,343, the disclosures of which are expressly incorporated by reference herein in their entirety. The efficacy of the lamp is improved by reflecting infrared energy emitted by the lamp back substantially toward the arc so that the arc temperature may be increased and maintained without any increase in input power from the excitation source. The infrared reflecting film, however, operates to increase the temperature of the entire bulbous portion. The temperatures of the hot regions as well as the cold regions are increased.

It is also known to use an opaque and diffuse end coat on the bulbous portion. For example, see U.S. Pat. No. 3,325,662 disclosing a calcium pyrophosphate coating and U.S. Pat. No. 3,374,377 disclosing a zirconium oxide coating, the disclosures of which are expressly incorporated by reference herein in their entirety. The end coat absorbs infrared radiation to act as a heat trap. If the lamp is intended to be operated vertically only the bottom end is coated. If the lamp is intended to be operated vertically or horizontally both ends are coated. Because the end coat is opaque most of the visible radiation is reflected back, however, part is absorbed and illuminous output of the lamp is reduced by about 5 to 10%. Additionally, the visible radiation that is reflected by the end coat is reflected in a uncontrolled manner causing stray light. The stray light results in glare that is undesirable in optically controlled applications. Furthermore, the end coat is applied by dipping or spraying which results in low repeatability. The height of the end coat varies about 1 millimeter. This is undesirable because the performance of the metal halides, and thus the efficacy of the lamp, is closely connected to the height of the end coat.

U.S. Pat. No. 4,307,315, the disclosure of which is expressly incorporated by reference herein in its entirety, discloses a high pressure discharge lamp having a quartz vessel. A portion of the vessel is ultraviolet radiation absorbing quartz glass and the remainder is ultraviolet radiation transmitting quartz. Fabrication of the vessel from doped and undoped quartz pieces is laborious and impractical for arc tubes of a small size.

Accordingly, a need exists for a high intensity light source having a transparent coating that imposes an additional thermal load at cold regions so that high metal halide vapor pressure can be maintained. It would be desirable to have a coating that does not raise the temperature of the hot region and can be applied in a tightly controlled and economical manner.

SUMMARY OF THE INVENTION

The present invention relates to a light source having a transparent heat conserving coating that overcomes the above-described problems of the related art.

According to the invention, a light source is provided that includes a vitreous light-transmitting envelope and means for generating light. The light generating means is capable of generating light within a sealed chamber of the envelope. The envelope includes a transparent film capable of absorbing ultraviolet radiation and transmitting visible radiation emitted by the light generating means. During operation of the light generating means, in absence of the transparent coating, the sealed chamber forms hot and cold regions. Therefore, the transparent coating covers the cold region to impose an additional heat load on the cold region to improve the efficacy, life, and color of the lamp. Preferably, the transparent film also reflects infrared radiation emitted by the light source back to the light generating means.

BRIEF DESCRIPTION OF THE DRAWINGS

These and further features of the present invention will be apparent with reference to the following description and drawings, wherein.

DETAILED DESCRIPTION OF THE PREFERRED EMBODIMENTS

Figure 1:
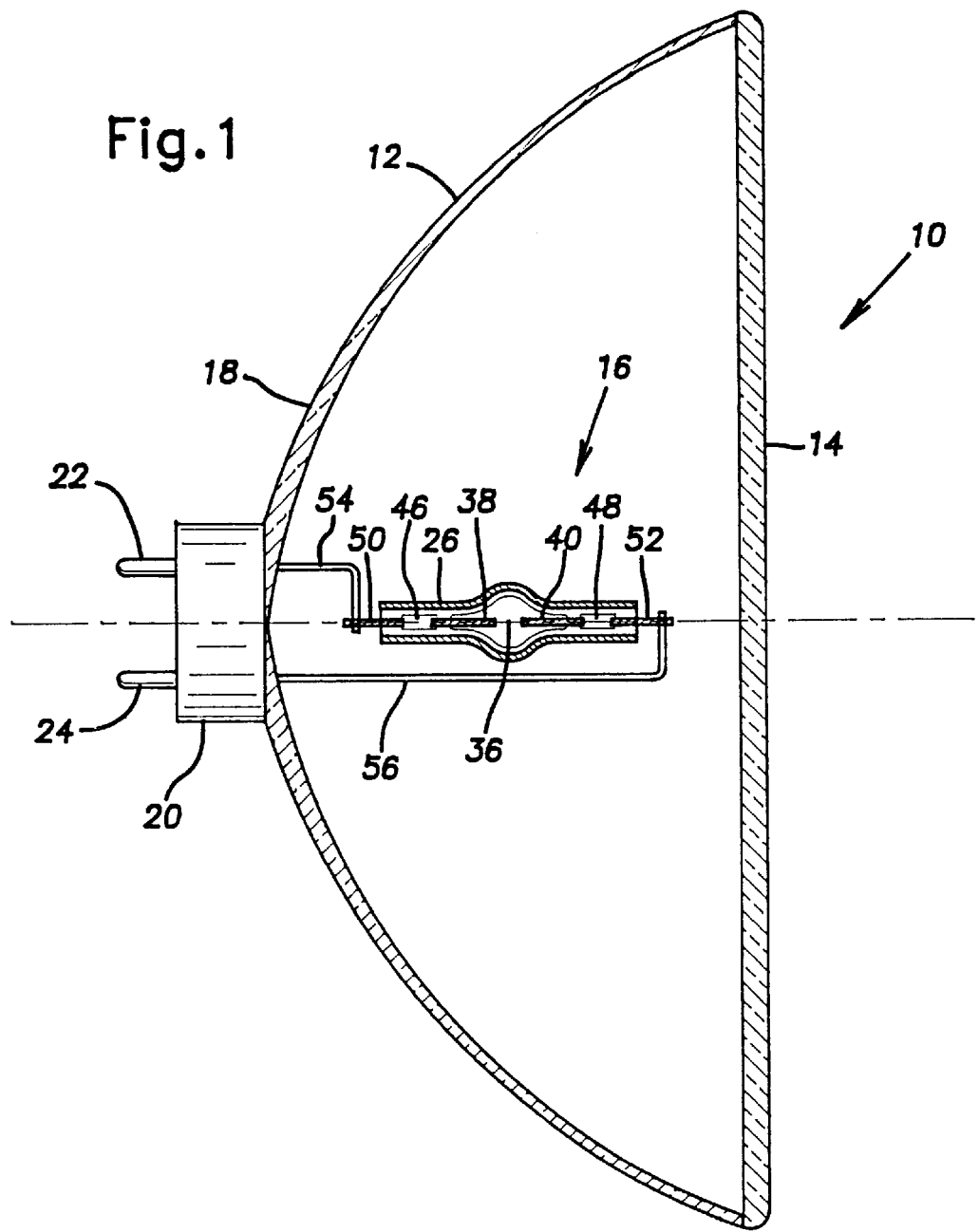
FIG. 1 is an elevational view, partially in cross-section, generally illustrating a lamp with a light source oriented in a horizontal manner.

FIG. 1 is a side view generally illustrating a light system or lamp 10 including a reflector 12, a lens 14, and a light source such as an arc tube 16 in accordance with one embodiment of the present invention. The light source includes means for generating light, such as arc discharge means including a pair of electrodes and a fill. Other means for generating light can be utilized such as for example, filament, fluorescent, or electrodeless discharge means.

The reflector 12 has a rear section 18 having a connector 20 mounted thereon with prongs 22, 24 capable of being connected to an excitation source. The reflector 12 has a predetermined focal length. The lens 14 is mated to a front section of the reflector 12. The lens 14 is of a transparent material such as glass or plastic and preferably has a face formed of prism members.

The arc tube 16 is positioned within the reflector 12 so as to be approximately disposed near the focal length of the reflector 12. In the illustrated embodiment, the light source 16 is oriented in a horizontal manner relative to and along the axis of the reflector 12.

Figure 2:
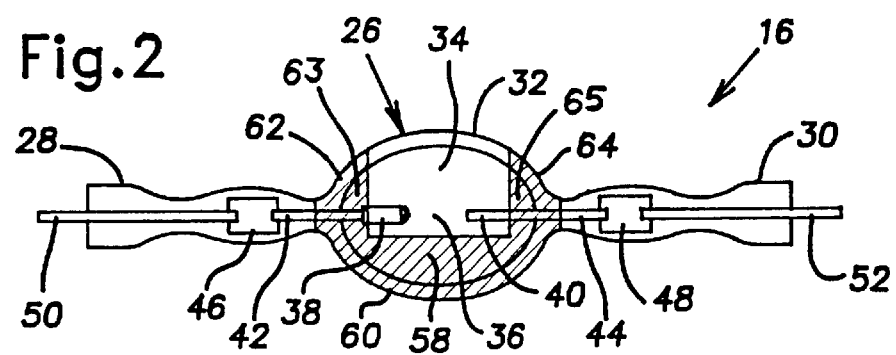
FIG. 2 is an enlarged view of the light source of FIG. 1 having a transparent heat conserving coating according to the present invention.

As best seen in FIG. 2, the arc tube 16 includes a light transmissive envelope 26 preferably formed of quartz or fused silica which has longitudinal neck portions or press seals 28, 30 and an intermediate bulbous portion 32 containing a sealed chamber 34. The sealed chamber 34 encloses an arc discharge region 36 and contains a suitable gaseous fill for maintaining an arc discharge. The bulbous portion 32 preferably has a substantially elliptical or spherical shape along its longitudinal axis such that any radiation emitted by the arc discharge that is reflected by the envelope 26 is reflected substantially back toward the arc discharge. The envelope 26 typically has an overall length in the range of about 15 millimeters (mm) to about 40 mm, neck portion diameters in the range of about 2 mm to about 5 mm, and a bulbous portion mid-point diameter in the range of about 6 mm to about 15 mm.

Electrodes 38, 40 are positioned along the longitudinal axis at opposite ends of the arc tube 16 at the discharge region 36 and are spaced apart from each other by an arc gap. The arc gap is typically in the range of about 2 mm to about 5 mm. The arc tube 16 can alternatively be a single ended type with both electrodes disposed at the same end of the arc tube and separated by the given predetermined range.

The electrodes 38, 40 are of a rod-like construction formed of a refractory metal such as tungsten or a tungsten alloy with one to three percent thorium content. In a conventional manner, each of the electrodes 38, 40 are connected by leads 42, 44 and refractive metal foil members 46, 48 to respective inleads 50, 52. The foil members 46, 48 are sealed in opposite neck portions 28, 30 of the envelope 26. Although not shown, the leads 42, 44 are typically wrapped, in a conventional manner, with respective coils of wire to facilitate alignment of the leads 42, 44 along the longitudinal axis of the arc tube 16. As shown in FIG. 1, the inleads 50, 52 are electrically connected to relatively thick outer leads 54, 56 which are in turn respectively connected to the prong elements 22, 24.

The fill contained in the arc tube 16 preferably includes a rare gas, mercury, and a metal halide. The rare gas, such as argon or xenon, typically has a fill pressure at room temperature in the range of about 2 atmospheres to about 15 atmospheres. The mercury is typically in an amount in the range of about 2 milligrams (mg) to about 10 mg. The amount of mercury is chosen so that with a chamber 34 of a certain size and a distance between the electrodes 38, 40 of a certain amount the voltage drop across the arc tube 16 is a convenient value such that the convection currents within the arc tube 16 that produce bowing of the arc do not produce excessive bowing. The operating pressure which is a result of both the rare gas and the mercury is in the range of about 3 to 100 atmospheres. The metal halide is a mixture preferably of sodium and scandium iodides with a molar ratio of about 19:1. The rare gas operates to provide sufficient instant light for start up. The mercury and metal halide ingredients operate to provide for a long life and high efficacy lamp.

During operation of the arc tube 16 a nonuniform temperature distribution is formed in the bulbous portion 32 due to internal convection. Typically, at least one hot region and at least one cold region are formed resulting in thermal gradients across the bulbous portion 32. Typically, the metal halides in the sealed chamber 34 migrate to the coldest part of the sealed chamber 34 and condense on the wall of the sealed chamber 34 resulting in reduced efficacy and color. Therefore, a transparent film or coating 58 is applied to cover the cold region to impose an additional heat load on the cold region to reduce the thermal gradient and maintain a high metal halide vapor pressure.

The transparent film 58 is effective to absorb ultraviolet radiation and transmit visible radiation. Preferably, the transparent film 58 also is effective to reflect infrared radiation. The transparent film 58 of the preferred embodiment reflects infrared radiation having wavelengths from about 0.8 microns to about 2.0 microns.

The location of the cold region is dependent on operating conditions of the arc tube 16, such as the orientation of the arc tube 16. A horizontally disposed arc tube 16 typically forms a cold region at a bottom 60 of the bulbous portion 32. Therefore in the preferred embodiment, the transparent film 58 covers the bottom 60 of the bulbous portion 32 as seen in FIG. 2. Preferably at least one-fourth, and more preferably one-third to one-half, of the external surface at the bottom 60 of the bulbous portion 32 is covered by the transparent film 58. In some situations more than half of the bulbous portion may be required to be covered.

Typically, horizontally disposed arc tubes 16 also form cold regions at ends of the sealed chamber 34. Therefore in the preferred embodiment, the transparent film 58 also covers the exterior surface of the envelope 26 in the areas adjacent the ends 63, 65 of the sealed chamber 34 as seen in FIG. 2. The areas adjacent the ends 63, 65 of the sealed chamber 34 are generally at ends 62, 64 of the bulbous portion 32 at a transition from the bulbous portion 32 to the neck portions 28, 30. It will be noted, however, that it is generally more important to cover the bottom 60 rather than the ends 63, 65 of the sealed chamber 34 for a horizontally disposed arc tube 16.

It will be noted that for light sources having other operating conditions, such as disposed in other orientations, the cold region may be in different location. For example, a vertically disposed arc tube typically has a cold spot at the bottom end of the sealed chamber. Therefore, the transparent coating would preferably cover at least the external surface at the lower end of the bulbous portion adjacent the bottom end of the sealed chamber.

The transparent film 58 preferably is a dichroic coating, that is, a dielectric interference filter coating having alternating layers of high and low index of refraction materials. The transparent film 58 of the preferred embodiment includes thirty-six alternating layers of tantala and silica or titania and silica. The layers are preferably deposited on the envelope 26 by low pressure chemical vapor deposition (LPCVD) using borate masking to achieve the predetermined pattern. The preferred process for forming the desired pattern of the transparent film 58 includes forming a boric oxide mask on a portion of the envelope 26, applying the transparent film 58, and removing the transparent film 58 from masked areas of the envelope 26 by disolving the mask in an aqueous solution. A suitable coating and method is taught in U.S. patent application Ser. No. 08/165,447 the disclosure of which is expressly incorporated by reference herein in its entirety. The coating is refractory and thus able to withstand the high temperatures encountered during operation of the light source.

Other transparent films 58 that transmit visible radiation, absorb ultraviolet radiation, and have suitable properties for use on the light source 16 can be utilized. For example, the transparent film 58 can be a cured hydrolyzable silicon alkoxide sol with colloidal cerci-titania as taught in U.S. Pat. No. 4,799,963 the disclosure of which is expressly incorporated by reference herein in its entirety.

Initial application of an excitation source across the electrodes 38, 40 causes the rare gas to ionize and produce light generally instantly. The continued application of the excitation source causes the vaporization and ionization of the mercury along with the metal halide to provide continuous light. The transparent film 58 imposes an additional thermal load at the cold region of the sealed chamber 34 so that high metal halide vapor pressure can be maintained. The temperature of the hot region or potential hot region of the sealed chamber 34 can be maintained at a lower level by reducing power input or increasing the surface area of the sealed chamber 34 thereby increasing the efficacy and life of the light source 16. The transparent film 58 also increases the temperature of the cold region due to decreased thermal emittance by reflecting the infrared radiation emitted by the arc discharge substantially back toward the arc discharge region 36. The transparent film 58 transmits the visible radiation so that all the visible radiation can be reflected by the reflector 12 into a collimated beam without producing glare.

Although the light source 16 according to the invention has been described as applied to a particular lamp or lighting system 10 it is understood that the light source 16 could be utilized in other lamps for optically controlled applications such as automotive, display, and fiber optic illumination as well as lamps for non-optically controlled applications.

The invention has been described with reference to the preferred embodiments. Obviously, modifications and alterations will occur to others upon a reading and understanding of the specification. It is intended to include all such modifications and alterations insofar as they come within the scope of the appended claims or equivalents thereof.

What is claimed is:

1. A light source capable of being operated to produce light, said light source comprising:
   means for generating light;
   a vitreous light-transmitting envelope having a sealed chamber, said light generating means being capable of generating light within said sealed chamber; and a transparent film capable of absorbing ultraviolet radiation while transmitting visible radiation, wherein said sealed chamber has, during operation in the absence of the transparent film, at least one hot region and at least one cold region, said transparent film covering only said at least one cold region to impose an additional heat load at said at least one cold region, said at least one hot region and a remainder of said envelope other than said at least one cold region each being free from said transparent film.

2. The light source as defined in claim 1, wherein said transparent film is capable of reflecting infrared radiation.

3. The light source as defined in claim 1, wherein said light generating means includes first and second electrodes spaced apart in the envelope for forming an arc therebetween.

4. The light source as defined in claim 3, wherein said sealed chamber of said envelope contains a gas fill including a rare gas, mercury, and a metal halide.

5. The light source as defined in claim 3, wherein said envelope has a bulbous portion and said electrodes generally define an axis of said bulbous portion, said axis being horizontally disposed during operation of said light generating means, said bulbous portion having a top portion and a bottom portion during operation of said light generating means.

6. The light source as defined in claim 5, wherein said transparent film generally covers said bottom portion of said bulbous portion.

7. The light source as defined in claim 6, wherein said transparent film covers at least one-fourth of the external surface of said envelope bulbous portion.

8. The light source as defined in claim 7, wherein said transparent film covers approximately one-third to one half of the external surface of said envelope bulbous portion, said top portion of said bulbous portion being generally free from said transparent film.

9. The light source as defined in claim 6, wherein said transparent film also covers an exterior surface of the envelope in the areas adjacent ends of the sealed chamber.

10. The light source as defined in claim 5, wherein said transparent film generally covers an exterior surface of the envelope in the areas adjacent ends of the sealed chamber.

11. The light source as defined in claim 1, wherein said envelope has a bulbous portion with two ends and said transparent film generally covers an exterior surface of the envelope in the area adjacent at least one of said ends of said envelope bulbous portion.

12. The light source as defined in claim 1, wherein said transparent film is a dichroic coating having alternating layers of high and low index of refraction materials.

13. The light source as defined in claim 12, wherein said dichroic coating comprises alternating layers of tantala and silica.

14. The light source as defined in claim 12, wherein said dichroic coating comprises alternating layers of titania and silica.

15. The light source as defined in claim 1, wherein said envelope has a bulbous portion defining said sealed chamber and neck portions extending from opposite sides of said bulbous portion, each neck portion being free from said transparent film.

16. A light system comprising:
   a light source having means for generating light and a vitreous light-transmitting envelope having a sealed chamber, said light generating means being capable of generating light within said sealed chamber;
   a reflector having an active portion disposed relative to the light source to receive light therefrom and direct the light in a desired direction; and
   a transparent film capable of absorbing ultraviolet radiation while transmitting visible radiation, wherein said sealed chamber has, during operation in the absence of the transparent film, at least one hot region and at least one cold region, said transparent film covering only said at least one cold region to impose an additional heat load at said at least one cold region, said at least one hot region and a remainder of said envelope other than said at least one cold region each being free from said transparent film, said transparent film transmitting said visible radiation substantially to said reflector.

17. The light system as defined in claim 16, wherein said transparent film is capable of reflecting infrared radiation.

18. The light system as defined in claim 16, wherein said light generating means includes first and second electrodes spaced apart in the envelope for forming an arc therebetween and generally defining an axis of a bulbous portion of said envelope, said axis being horizontally disposed during operation of said light source.

19. The light system as defined in claim 18, wherein said transparent film covers the bottom of said bulbous portion.

20. The light system as defined in claim 19, wherein said transparent film also covers an exterior surface of the envelope in the areas adjacent ends of the sealed chamber.

21. The light system as defined in claim 16, wherein said envelope has a bulbous portion with two ends and said transparent film covers an exterior surface of the envelope in the area adjacent at least one of said ends of said envelope bulbous portion.

22. The light system as defined in claim 16, wherein said transparent film is a dichroic coating having alternating layers of high and low index of refraction materials.

23. The light system as defined in claim 16, wherein said envelope has a bulbous portion defining said sealed chamber and neck portion portions extending from opposite sides of said bulbous portion, each neck portion being free from said transparent film.

* * * * *